(12) United States Patent
Kowalski et al.

(10) Patent No.: US 11,748,932 B2
(45) Date of Patent: Sep. 5, 2023

(54) CONTROLLABLE IMAGE GENERATION

(71) Applicant: Microsoft Technology Licensing, LLC, Redmond, WA (US)

(72) Inventors: Marek Adam Kowalski, Cambridge (GB); Stephan Joachim Garbin, London (GB); Matthew Alastair Johnson, Cambridge (GB); Tadas Baltrusaitis, Cambridge (GB); Martin De la Gorce, Cambridge (GB); Virginia Estellers Casas, Cambridge (GB); Sebastian Karol Dziadzio, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 16/915,863

(22) Filed: Jun. 29, 2020

(65) Prior Publication Data

US 2021/0335029 A1    Oct. 28, 2021

Related U.S. Application Data

(60) Provisional application No. 63/015,846, filed on Apr. 27, 2020.

(51) Int. Cl.
*G06T 15/00* (2011.01)
*G06T 9/00* (2006.01)

(52) U.S. Cl.
CPC ............ *G06T 15/005* (2013.01); *G06T 9/002* (2013.01)

(58) Field of Classification Search
None
See application file for complete search history.

(56) References Cited

U.S. PATENT DOCUMENTS

| 10,552,667 | B1 * | 2/2020 | Bogan, III | ........... G06K 9/6262 |
| 2008/0309662 | A1 * | 12/2008 | Hassner | .................. G06K 9/20 345/419 |

(Continued)

OTHER PUBLICATIONS

Lombardi, et al., "Deep Appearance Models for Face Rendering", in Journal of ACM Transactions on Graphics, vol. 37, Issue 4, Aug. 1, 2018, 13 Pages.

(Continued)

*Primary Examiner* — Anh-Tuan V Nguyen
(74) *Attorney, Agent, or Firm* — Barta, Jones & Foley, PLLC

(57) ABSTRACT

In various examples there is a method of image processing comprising: storing a real image of an object in memory, the object being a specified type of object. The method involves computing, using a first encoder, a factorized embedding of the real image. The method receives a value of at least one parameter of a synthetic image rendering apparatus for rendering synthetic images of objects of the specified type. The parameter controls an attribute of synthetic images of objects rendered by the rendering apparatus. The method computes an embedding factor of the received value using a second encoder. The factorized embedding is modified with the computed embedding factor. The method computes, using a decoder with the modified embedding as input, an output image of an object which is substantially the same as the real image except for the attribute controlled by the parameter.

20 Claims, 10 Drawing Sheets

(56) References Cited

U.S. PATENT DOCUMENTS

| | | | | |
|---|---|---|---|---|
| 2017/0293838 | A1* | 10/2017 | Min | G06N 3/045 |
| 2018/0068463 | A1* | 3/2018 | Risser | G06T 7/45 |
| 2018/0336880 | A1* | 11/2018 | Arik | G10L 15/063 |
| 2018/0338147 | A1* | 11/2018 | Nowozin | H04N 19/94 |
| 2019/0026631 | A1* | 1/2019 | Carr | G06N 3/088 |
| 2019/0147234 | A1* | 5/2019 | Kicanaoglu | G06N 3/08 382/218 |
| 2019/0147334 | A1* | 5/2019 | Lisowska | G06N 3/088 706/25 |
| 2019/0171908 | A1* | 6/2019 | Salavon | G06N 3/088 |
| 2019/0205667 | A1* | 7/2019 | Avidan | G06V 10/82 |
| 2020/0065635 | A1* | 2/2020 | Lim | G06T 7/73 |
| 2020/0090389 | A1 | 3/2020 | Hadap et al. | |
| 2020/0107072 | A1* | 4/2020 | Lomada | G06N 3/088 |
| 2020/0125944 | A1* | 4/2020 | Jauhar | G06F 40/30 |
| 2020/0151559 | A1* | 5/2020 | Karras | G06N 3/088 |
| 2020/0226724 | A1* | 7/2020 | Fang | G06T 5/005 |
| 2020/0310370 | A1* | 10/2020 | Bogo | G05B 13/0265 |
| 2020/0356808 | A1* | 11/2020 | Kim | G06N 3/088 |
| 2020/0410303 | A1* | 12/2020 | Swint | G06V 20/35 |
| 2021/0004719 | A1* | 1/2021 | Dupont De Dinechin | G06N 3/0454 |
| 2021/0064907 | A1* | 3/2021 | Yang | G06K 9/6262 |
| 2021/0073672 | A1* | 3/2021 | Shi | G06N 20/20 |
| 2021/0089759 | A1* | 3/2021 | Todorov | G06K 9/00281 |
| 2021/0097343 | A1* | 4/2021 | Goodsitt | G06K 9/6257 |
| 2021/0097402 | A1* | 4/2021 | Ohta | G06N 3/0472 |
| 2021/0142440 | A1* | 5/2021 | Ahn | G06K 9/00281 |
| 2021/0160645 | A1* | 5/2021 | Olivieri | H04S 3/008 |
| 2021/0166433 | A1* | 6/2021 | Lee | G06T 9/002 |
| 2021/0264655 | A1* | 8/2021 | Chen | G06T 7/337 |
| 2021/0279956 | A1* | 9/2021 | Chandran | G06K 9/00308 |
| 2021/0327135 | A1* | 10/2021 | Borovikov | A63F 13/63 |

OTHER PUBLICATIONS

Usman, et al., "PuppetGAN: Cross-Domain Image Manipulation by Demonstration", in Proceedings of the IEEE International Conference on Computer Vision, Oct. 27, 2019, pp. 9450-9458.

Zakharov, et al., "Few-Shot Adversarial Learning of Realistic Neural Talking Head Models", in repository of arXiv, arXiv:1905.08233, May 20, 2019, pp. 1-19.

Kowalski, et al., "CONFIG: Controllable Neural Face Image Generation", in Repository of arXiv:2005.02671v2, May 12, 2020, 25 Pages.

Lee, et al., "High-Fidelity Synthesis with Disentangled Representation", in Repository of arXiv:2001.04296v1, Jan. 13, 2020, 25 Pages.

Nguyen-Phuoc, et al., "HoloGAN: Unsupervised Learning of 3D Representations From Natural Images", in Proceedings of the IEEE/CVF International Conference on Computer Vision, Oct. 27, 2019, pp. 7587-7596.

"International Search Report & Written Opinion issued in PCT Application No. PCT/US21/025696", dated Jul. 22, 2021, 11 Pages.

* cited by examiner

CONTROLLABLE IMAGE GENERATION

CROSS-REFERENCE TO RELATED APPLICATION

This application claims the benefit of U.S. provisional application No. 63/015,846 filed on Apr. 27, 2020, entitled "Controllable image generation" the entirety of which is hereby incorporated by reference herein.

BACKGROUND

The process of rendering an image refers to a process of computing a 2D image in a digital form suitable for display. Where a 3D model is used to render a 2D image with traditional rendering techniques, operations such as ray tracing are used to compute the 2D image as part of the rendering process.

Recent advances in generative adversarial networks (GANs) have enabled the production of realistic high resolution images of smooth organic objects such as faces. Generating photorealistic human bodies, and faces in particular, with traditional rendering pipelines that do not use neural networks is notoriously difficult, requiring hand-crafted three dimensional (3D) assets. However, once these 3D assets have been generated it is possible to use a conventional renderer to render the face from different directions and in different poses. In contrast, GANs can be used to easily generate realistic head and face images without the need to author expensive 3D assets, by training on curated datasets of 2D images of real human faces. However, it is difficult to enable meaningful control over this generation without detailed hand labelling of the dataset. Even when conditional models are trained with detailed labels, they struggle to generalize to out-of-distribution combinations of control parameters such as children with extensive facial hair or young people with gray hair. Thus it has not previously been possible for GAN based rendering techniques to replace traditional rendering pipelines.

Rendering and animation of realistic objects such as human faces is a long-standing problem in the field of computer graphics. To create an animation of a specific actor's face one usually requires a 3D capture of the actor's face performing various expressions. The capture is then used to create a rigged 3D model which can be animated. To render the face, additional artistic work is necessary to recreate the elements of the face that are difficult to capture in 3D, such as hair. The whole process is very time-consuming and expensive.

The embodiments described below are not limited to implementations which solve any or all of the disadvantages of known image processing methods.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method of image processing comprising: storing a real image of an object in memory, the object being a specified type of object. The method involves computing, using a first encoder, a factorized embedding of the real image. The method receives a value of at least one parameter of a synthetic image rendering apparatus for rendering synthetic images of objects of the specified type. The parameter controls an attribute of synthetic images of objects rendered by the rendering apparatus. The method computes an embedding factor of the received value using a second encoder. The factorized embedding is modified with the computed embedding factor. The method computes, using a decoder with the modified embedding as input, an output image of an object which is substantially the same as the real image except for the attribute controlled by the parameter.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in an image processing system for images of faces, the system described is provided as an example and not a limitation. As those skilled in the art will appreciate, the present examples are suitable for processing images of other types of object where there is a synthetic rendering apparatus available for rendering synthetic images of the type of object concerned. Any known synthetic rendering apparatus is used which takes parameters as input to specify attributes of the synthetic images it generates.

Figure 1:
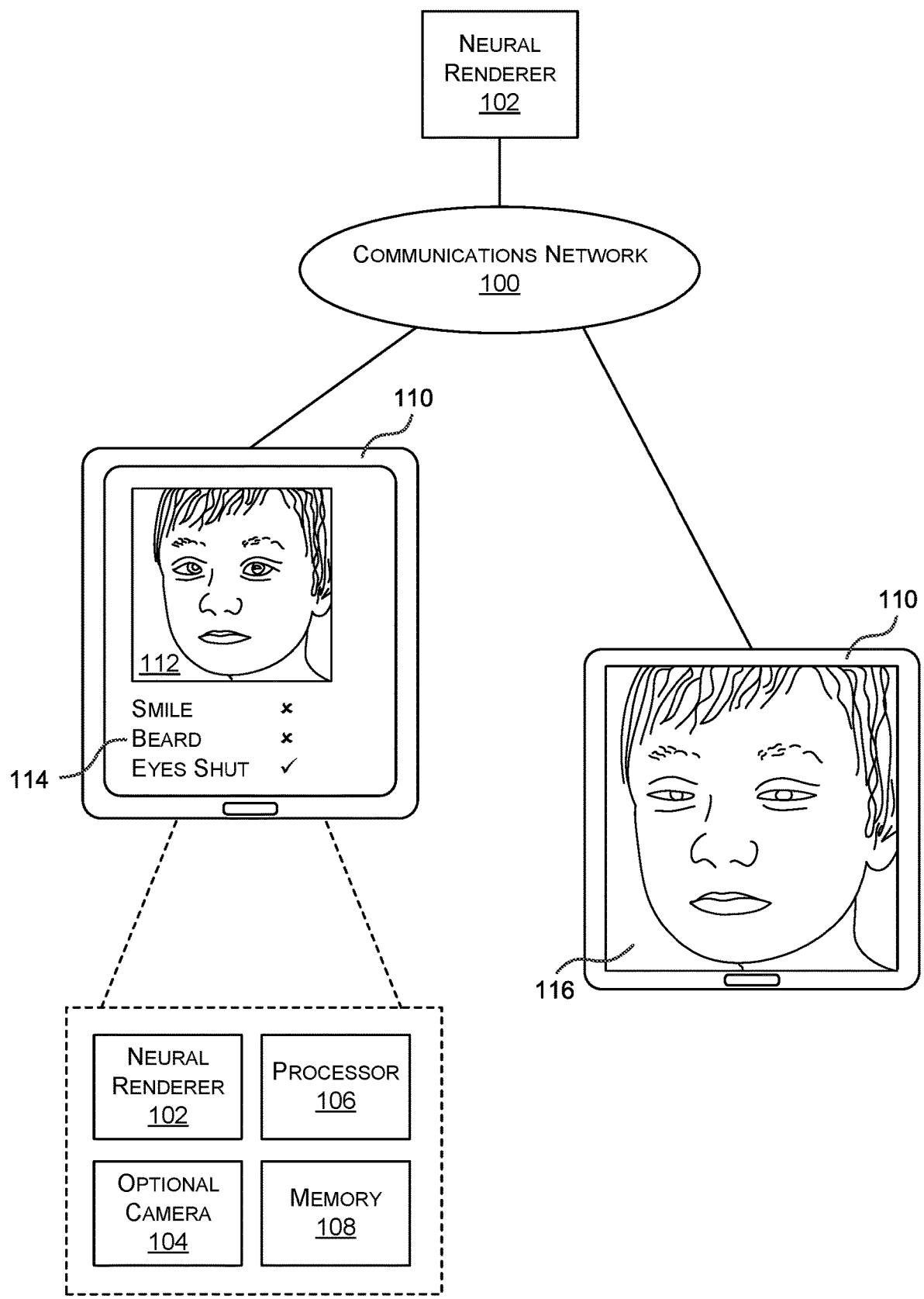
FIG. 1 is a schematic diagram of a neural renderer deployed as a cloud service and/or within an end user computing device.

FIG. 1 is a schematic diagram of a neural renderer 102 deployed as a cloud service and/or at an end user computing device 110. The neural renderer comprises one or more neural networks used for various image processing tasks including: generating an image of an object using neural networks and where it is possible to control attributes of the image using semantically meaningful parameters.

Where the neural renderer is deployed as a cloud service it is implemented at one or more web servers or other computing resources which are in communication with client devices such as end user computing device 110 via a communications network 100. A client device is able to send inputs to the neural renderer 102 comprising images and/or parameter values and, in response, receives one or more output images. The output images are stored or displayed.

Where the neural renderer is deployed at an end user device it is stored in local memory of the end user device and/or embodied in hardware or firmware at the end user device. In FIG. 1 a smart phone is illustrated as comprising (indicated by dotted lines) a neural renderer 102, a processor 106, an optional camera 104 and a memory 108. It is possible to have hybrids between the cloud service deployment and the end user device deployment. That is, the functionality of the neural renderer is distributed between the client device and other computing devices in some examples. A non-exhaustive list of suitable end user computing devices 110 is: smart phone, wearable computer, tablet computer, desktop computer, laptop computer, game console.

In the example of FIG. 1 an end user computing device 110 such as a smart phone shown on the left hand side of the figure displays a real image of a child's face in a neutral expression with eyes open and with no facial hair. A user inputs values of parameters including "no smile", "no beard" and "eyes shut". The neural renderer 102 generates an output image which is displayed at the smart phone on the right hand side in FIG. 1. The output image depicts the child's face with eyes shut, no smile and no beard. Previously it has not been possible to achieve this type of functionality using neural network technology. A significant level of control over generative neural network technology is achieved without sacrificing realism. Previous approaches using conditional models trained with detailed hand labelling of the dataset struggle to generalize to out of distribution combinations of control parameters such as children with facial hair. In contrast the present technology does not need detailed hand labeled datasets and performs well for combinations of control parameters such as children with facial hair.

In an example the trained neural renderer 102 takes as input an image of a face of a person to be animated such as an actor's face in one example. In this example, the neural renderer 102 also takes as input one or more of the following attributes: head pose, face expression, facial hair style, head hair style, hair colour, illumination, beard style, eyebrow style, eye colour, eye rotation, hair colour, head shape, lower eyelash style, texture, upper eyelash style. These attributes are parametrized in semantically meaningful ways that are commonly used in computer graphics. For example, face expression is parametrized as a sum of individual expression (smile, eyebrows raised, eyes open) with individually specified intensities.

The neural renderer 102 computes an output image depicting the person in the input image with the specified attributes. This allows for face animation and edition with minimal effort. The output image is stored or displayed.

The neural renderer 102 is also used to generate novel images in some examples as described in more detail with reference to FIG. 7.

Figure 2:
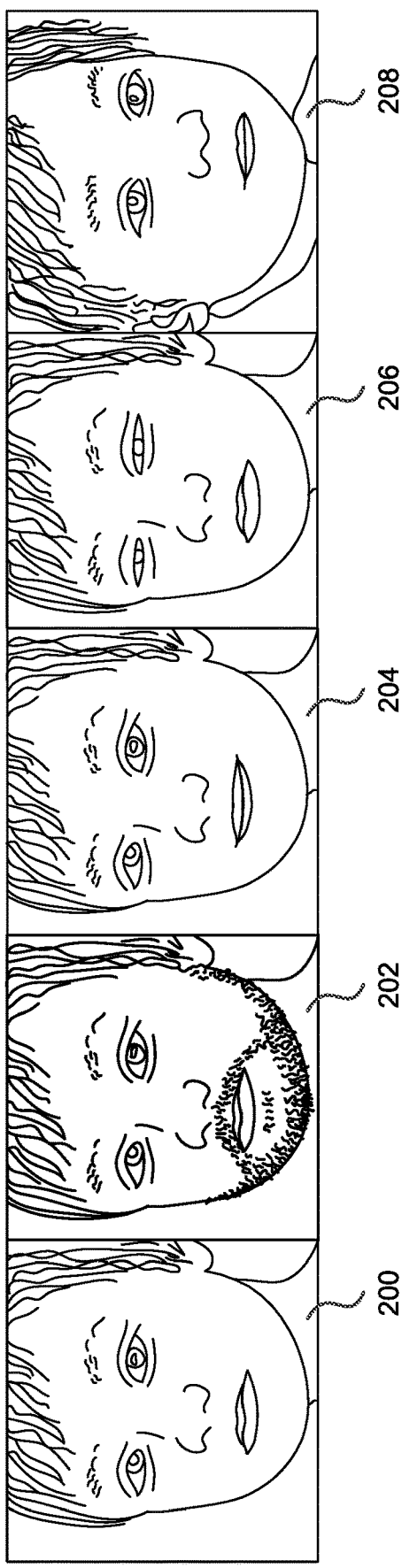
FIG. 2 is a schematic diagram of a real image of a child's face and of four images generated by a neural renderer such as that of FIG. 1.

FIG. 2 is a schematic diagram of a real image of a child's face 200 with a neutral expression. FIG. 2 also shows schematically four images 202, 204, 206, 208 of the child's face computed by the neural renderer and where different individual attributes have been controlled by setting parameter values. An end user is able to set the parameter values using a graphical user interface or in other ways. Image 202 was generated with a parameter for facial hair selected. Image 204 was generated with a parameter for a smile selected. Image 206 was generated with a parameter for eyes closed selected. Image 208 was generated with a parameter for head pose set to facing right.

Figure 3:
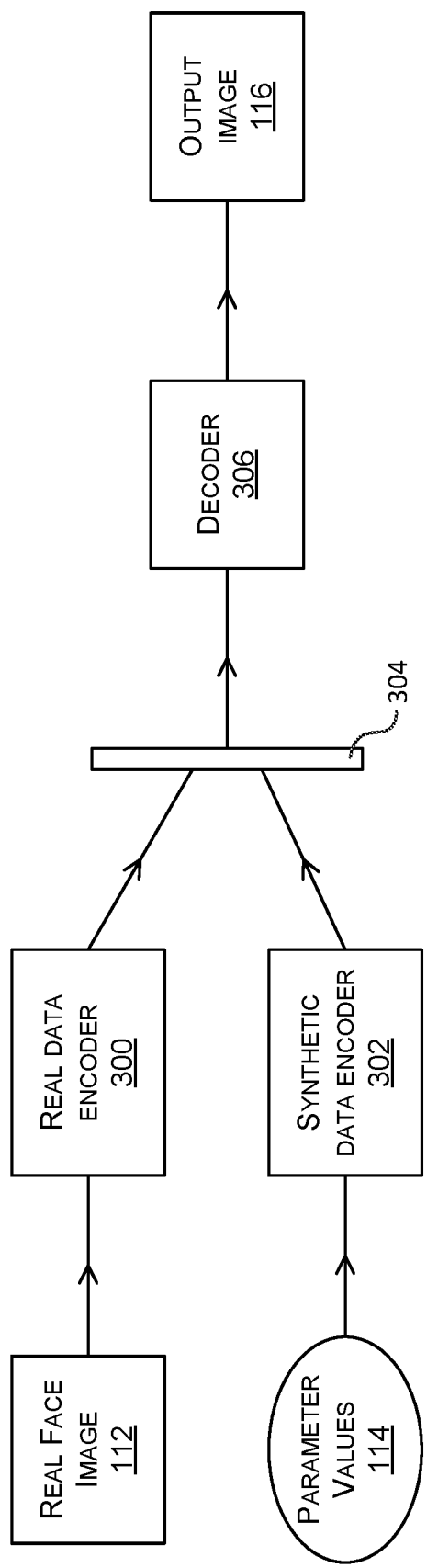
FIG. 3 is a schematic diagram of a neural renderer.

As explained in more detail below with reference to FIGS. 3 and 4 the neural renderer 102 comprises two encoders 300, 302 and a decoder 306 which together are sometimes referred to as an autoencoder. The two encoders 300, 302 correspond to two types of data used for training: real images with no labels and synthetically generated images with labels for attributes. A first one of the encoders is referred to herein as a real data encoder 300 since it has been trained using real images. When it is used at test time it can be used to encode real or synthetic images. In FIG. 3 it is shown as taking an image as input. The real data encoder 300 computes an embedding 304 by mapping the input image to the embedding which is typically expressed as a vector specifying a location in a multi-dimensional space. However, it is not essential to use a vector format as other formats are used in some cases.

A second one of the encoders is referred to herein as a synthetic data encoder 302 since it has been trained using synthetic images. It takes parameter values 114 as input as explained in more detail below and it computes a mapping from the parameter values 114 to an embedding 304 which is typically expressed as a vector specifying a location in a multi-dimensional space but is given in other formats in some cases. The multi-dimensional space is referred to as a latent space since it is learnt by the neural renderer 102 during training and is not observed.

To animate an object shown in an input image I, the image is first passed to the real data encoder 300 to generate an embedding z_0. Given z_0, the decoder 306 generates an output image that is very close to I. To generate an output image with a different attribute, the part of z_0 that corresponds to that attribute is modified. The synthetic data encoder 302 is factorized into separate parts that correspond to different attributes. To modify, for example, illumination, pass the desired illumination parameters to the synthetic data encoder 302, which generates a part v of the latent embedding that corresponds to that illumination. The embedding z_1 that corresponds to the same object as z_0 but with a different illumination is generated by swapping out the part that corresponds to illumination with v. The embedding z_1 is then input to the decoder which generates an output image 116 depicting the object and with the illumination as specified by the parameter values 114.

The encoders and the decoder comprise neural networks which have been trained as described in more detail below. The first and second encoders have been trained using adversarial training such that a distribution of embeddings computed by the first encoder is substantially the same as a distribution of embeddings computed by the second encoder. The second encoder is factorized so that the embeddings it computes have separate parts, each part corresponding to a factor of the factorization, and where each part corresponds to an attribute of a synthetic image rendering apparatus. The term "substantially the same" means near-enough identical to give a good working result.

The neural renderer is trained on both real and synthetically generated images. Since the synthetic images were generated with a traditional graphics pipeline, the renderer parameters for those images are readily available. The known correspondences between the renderer parameters and synthetic images are used to train a generative model that uses the same input parametrization as the graphics pipeline used to generate the synthetic data. This allows for independent control of various attributes of objects depicted in images. By simultaneously training the model on unlabeled images, it learns to generate photorealistic looking images, while enabling full control over the outputs.

The encoders and decoder of the disclosure operate in an unconventional manner to achieve controllable image generation.

The encoders and decoder of the disclosure improve the functioning of the underlying computing device by computing a factorized embedding and modifying one or more factors of the factorized embedding according to attributes desired in an output image generated from the modified factorized embedding.

The neural renderer 102 treats synthetic images $I_S$ and real images $I_R$ as two different subsets of a larger set of all possible face images. Hence, the neural renderer consists of a decoder G 306 and two encoders $E_R$ 300 and $E_S$ 302 that embed real and synthetic data into a common factorized latent space z. The following description refers to z predicted by $E_R$ and $E_S$ as $z_R$ and $z_S$ respectively. While the real data is supplied to the encoder as images $I_S \in I_R$, the synthetic data is supplied as vectors $\theta \in R^m$ that fully describe the content of the corresponding image $I_S \in I_S$. During training, to optionally increase the realism of the generated images two discriminator networks DR and DS are optionally used for real and synthetic data respectively.

Assume that the synthetic data is a reasonable approximation of the real data so that $I_S \cap I_R \neq \emptyset$. Hence, it is desirable for $E_S(\Theta)$ and $E_R(I_R)$, where $\Theta$ is the space of all $\theta$, to also be overlapping. To do so, a domain adversarial loss is introduced on z, that forces $z_R$ and $z_S$ to be close to each other.

Alternatively, or in addition, the functionality of the encoders and the decoder described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4:
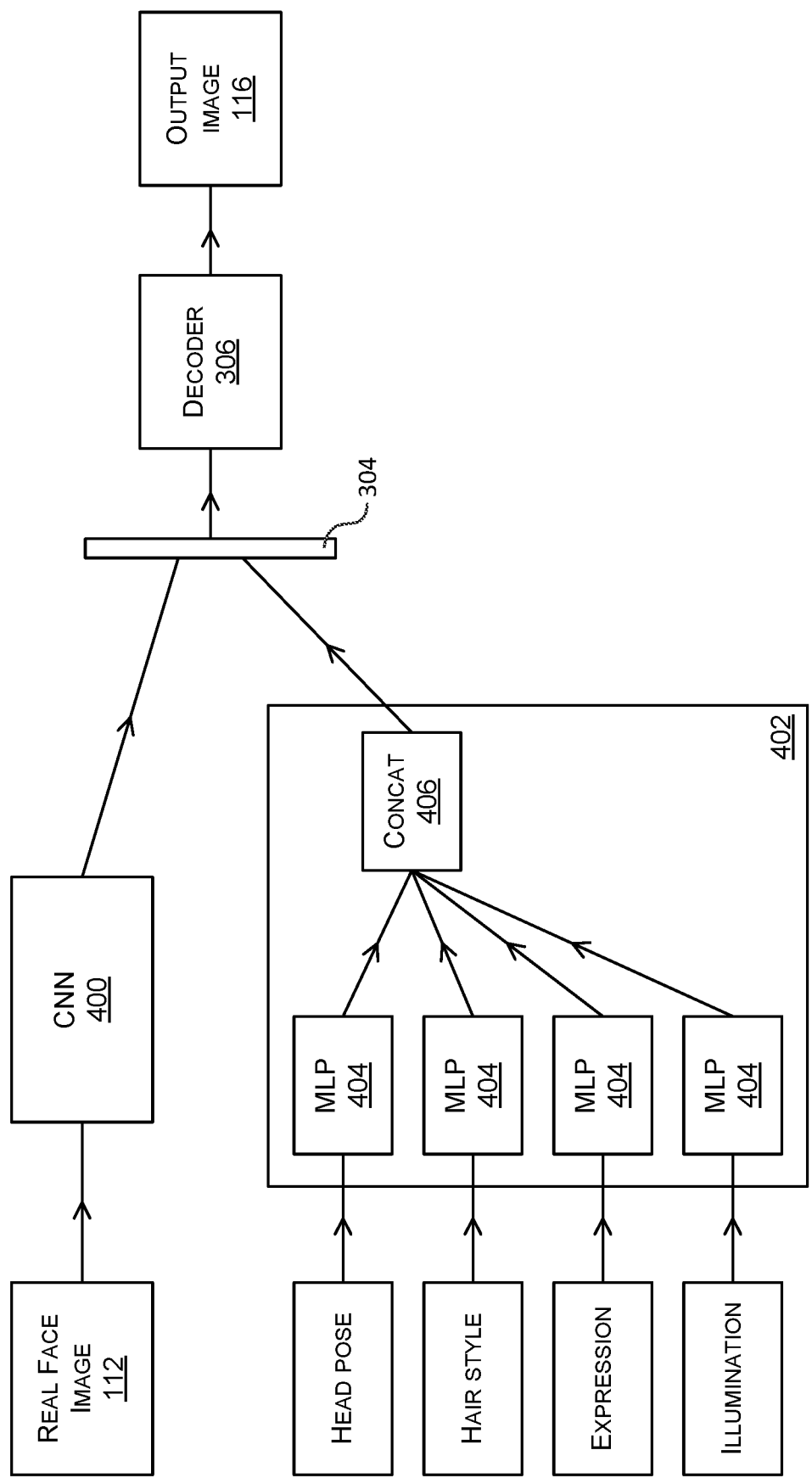
FIG. 4 is a schematic diagram of another neural renderer.

FIG. 4 shows another example of a neural renderer described in an example where the images are face images. The example of FIG. 4 is readily modified to operate for images depicting other classes of object. The first encoder is implemented as a convolutional neural network 400 which receives as input a real face image 112. The first encoder 400 has been trained to map an input image to an embedding 304 as described above with reference to FIG. 3.

The second encoder 402 comprises a plurality of parameterized functions which in this example are multi-layer perceptrons (MLPs) 404. Each parameterized function maps a parameter to a factor of a factorized embedding. Other types of parameterized function are used in some examples. Each parameterized function corresponds to a parameter of a synthetic image rendering apparatus. In the example of FIG. 4 there is one MLP for head pose, one MLP for hair style, one MLP for expression and one MLP for illumination. The particular parameters used depends on the type of objects the neural renderer has been trained to work with and on the parameters of the synthetic image rendering apparatus. The factors computed by the parameterized functions are concatenated using a concatenator 406 to form an embedding 304.

Each synthetic data sample 0 is factorized into k parts $\theta i$ to $\theta k$, such that:

$$\theta \in R^m = R^{m1} \times R^{m2} \times \ldots \times R^{mk}. \qquad \text{(equation 1)}$$

Each $\theta i$ corresponds to semantically meaningful input of the synthetic image rendering apparatus used to generate $I_S$. The synthetic data encoder $E_S$ 302, 402 maps each $\theta i$ to $zi$, a part of z, which thus factorizes z into k parts.

The factorized latent space allows for easy modification of various aspects of the output images 116. For example, one might encode a real image into z using $E_R$ and then change the illumination by swapping out the part of z that corresponds to illumination. Note that the part of z that is swapped in might come from $\theta i$, which is semantically meaningful, or it may come from a different real face image encoded by $E_R$ 400.

The decoder 306 is implemented using neural networks. It takes as input the embedding 304 and computes an output image 116 as described above.

Figure 5:
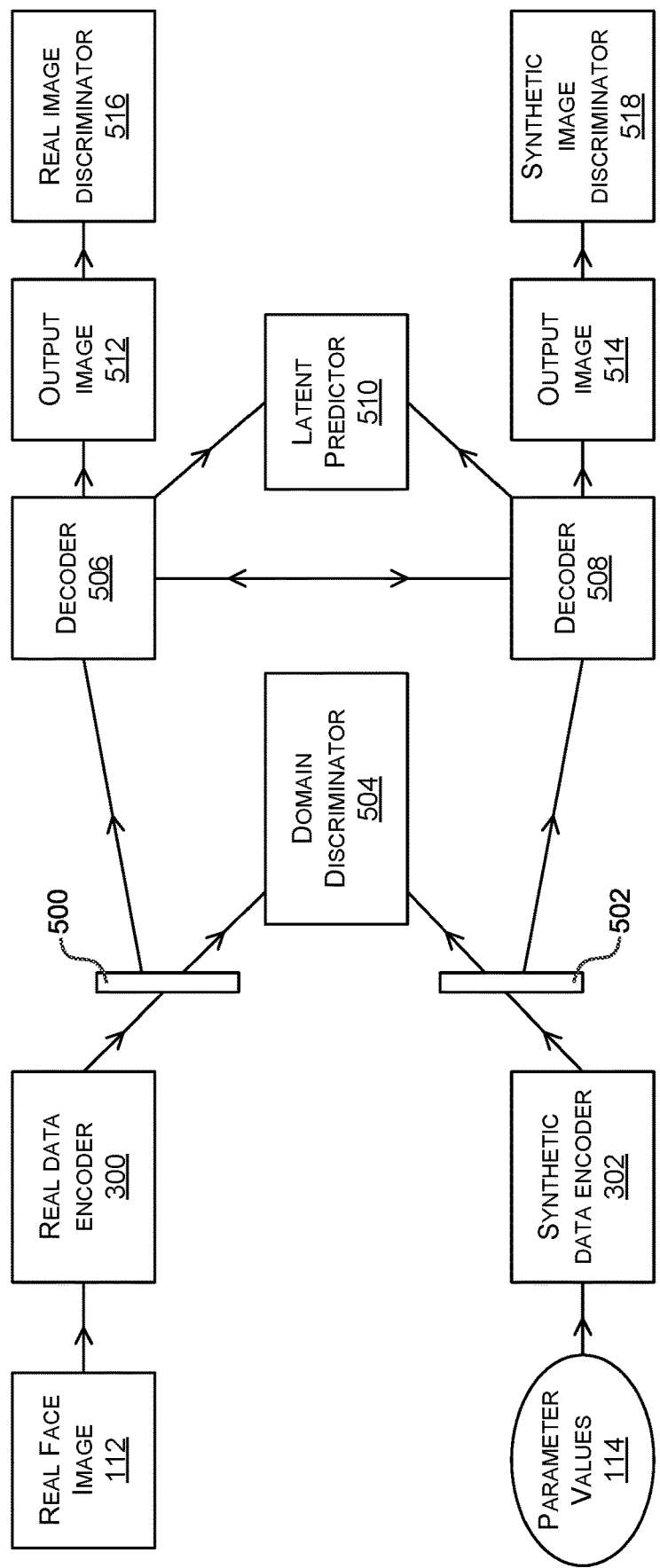
FIG. 5 is a schematic diagram of a neural renderer together with components used during training of the neural renderer.

FIG. 5 shows an example of a neural renderer with components used to train the neural renderer. FIG. 5 also shows the decoder 508 in two parts for ease of understanding the technology. Note that the two parts of the decoder 508 are neural networks with shared weights so that the two parts function as a single decoder as illustrated in FIGS. 3 and 4. FIG. 5 shows two output images 512, 514 because during training there are two output images, one from the part of the decoder associated with the real data encoder 300 and one from the part of the decoder associated with the synthetic data encoder 302. After training, when the neural renderer is in operation, the output image 512 associated with the real data encoder is not present. Training is done using both real images and synthetic images. Each training batch consists of a portion of real images and a portion of synthetic images.

The components used to train the neural renderer include: domain discriminator 504, latent regressor 510, real image discriminator 516 and synthetic image discriminator 518. Note that the latent regressor 510, real image discriminator 516 and synthetic image discriminator 518 are optional. After training the domain discriminator 504, latent regressor 510, real image discriminator 516 and synthetic image discriminator 518 are omitted. Each of the domain discriminator 504, latent regressor 510, real image discriminator 516 and synthetic image discriminator 518 are neural networks.

The function of the domain discriminator 504 is to enable adversarial training of the real data encoder 300 and synthetic data encoder 302 so that the distributions of embeddings computed by the real data encoder 300 and synthetic data encoder are substantially the same. Since the embeddings 502 computed by the synthetic data encoder are factorized by virtue of having the plurality of parameterized functions in the synthetic data encoder 302, the embeddings 500 computed by the real data encoder 300 are divisible into the same factors as for the factors of the synthetic data encoder. Each factor is a part of an embedding vector identified by the location of entries in the vector. The domain discriminator is trained with a domain adversarial loss between embeddings produced by the two encoders. It forces the distributions generated by the two encoders to be similar.

The latent regressor 510 is optional. The purpose of the latent regressor 510 is to encourage the interpretation of the latent space to be similar for real and synthetic data. The loss function used by the latent regressor is between embeddings predicted by the latent regressor and input embeddings.

The real image discriminator 516 is used to enable adversarial training so as to improve performance of the real data encoder 300 and the decoder 506. The real image discriminator 516 is trained using an adversarial loss between the images generated from the real data encoder 506 predictions and a real image training set.

The synthetic image discriminator 518 is used to enable adversarial training so as to improve the performance of the synthetic data encoder and the decoder 508. The synthetic image discriminator 518 is trained using an adversarial loss between the images generated from synthetic encoder 508 predictions and a synthetic image training set.

During training an image loss is used between the input real image I and output image produced with embedding predicted from I.

During training an image loss is used between a synthetic image corresponding to a set of attributes and an output image produced with a embedding predicted from those attributes.

In a particular embodiment, where the images are face images, the neural renderer is trained using the following loss functions:

To ensure that the output image G(z) 116 is close to the corresponding ground truth image IGT, a perceptual loss Lperc, which is the mean squared error between the activations of a pre-trained neural network computed on G(z) and IGT. In an example the pre-trained neural network is a 19 layer convolutional neural network trained on ImageNet.

An additional loss is optionally used to preserve eye gaze direction as follows:

$$L_{eye} = \omega_M > Mo(I_{GT} - G(Z_s)) \text{ with } \omega_M (1+|M|_1)^{-1} \quad \text{(equation 2)}$$

where M is a pixel-wise binary mask that denotes the iris, only available for $I_S$. Thanks to the accurate ground truth segmentation that comes with the synthetic data, similar losses are added for any part of the face if necessary.

The adversarial blocks are trained with a non-saturating GAN loss:

$$L_{GAN_D}(D,x,y) = \log D(x) + \log(1-D(y)), \quad \text{(equation 3)}$$

$$L_{GAN_G}(D,y) = \log(D(y)), \quad \text{(equation 4)}$$

where $L_{GAN_D}$ is used for the discriminator and $L_{GAN_G}$ is used for the generator, D is the discriminator, x is a real sample and y is the generated sample.

Figure 6:
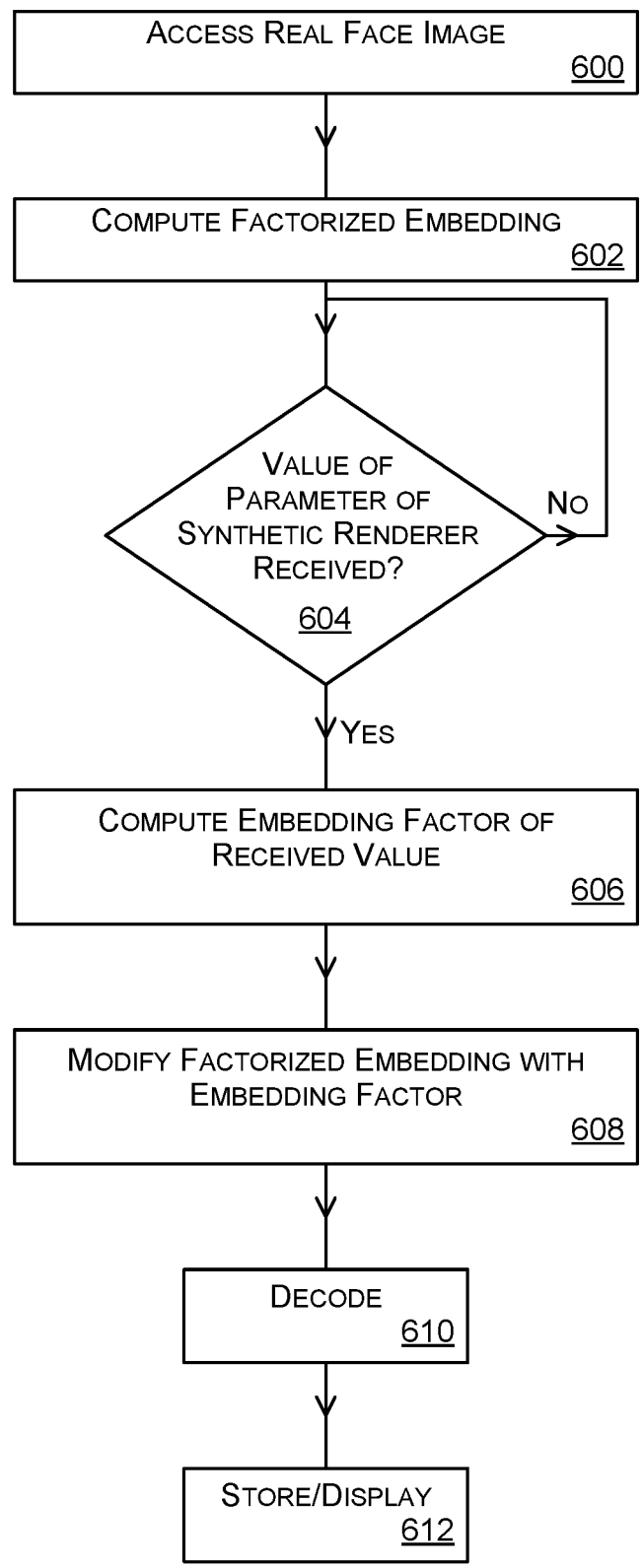
FIG. 6 is a flow diagram of a method of operation at a neural renderer.

FIG. 6 is a flow diagram of a method of operating a trained neural renderer to embed an existing image and then manipulate it. A new image is generated which depicts the object in the existing image but with one or more attributes changed according to parameter values input to the synthetic data encoder. No person-specific 3D assets are required for the method of FIG. 6. The realism of the generated images is found to be higher that that of the synthetic training data used during training. The use of a parameterization derived from a traditional graphics pipeline makes the neural rendered easy to use for people familiar with digital animation.

The neural renderer accesses 600 a real image such as a digital photograph, a frame of a video, or other real image. The real image depicts an object of a specified type such as human faces, human bodies, automobile, laptop computer, animal or any other type of object. The real image is input to a trained real image encoder which computes 602 a factorized embedding. The factorized embedding denotes a location in a multi-dimensional latent space which has been learnt by the neural renderer in advance during a training process. The embedding is factorized in that it is separable into parts, called factors, where each part corresponds to a parameter of a synthetic rendering apparatus. The synthetic rendering apparatus is configured to render synthetic images of object of the specified class and it takes as input values of parameters specifying attributes of the synthetic images it generates. In the example of FIG. 3 the synthetic rendering apparatus is the synthetic data encoder and the decoder which together are able to generate synthetic images depicting objects of the specified class.

The neural renderer checks 604 whether it has received values of one or more parameters of the synthetic renderer. If not it waits to receive those. The values are received as a result of user input or from another automated process such as a computer game. If one or more values have been received the neural renderer computes 606 an embedding factor for the received value. To compute the embedding factor the values are input to the synthetic data encoder which computes a prediction which is a predicted embedding factor for the received value.

The neural renderer modifies 608 the factorized embedding with the embedding factor by swapping a part of the factorized embedding, which corresponds with the parameter value input to the synthetic data encoder, with the embedding factor. The modified factorized embedding is input to the decoder.

The decoder decodes 610 the modified factorized embedding to generate an output image. The output image is the same as the real image accessed at operation 600 except that one or more attributes of the output image are changed according to the parameter values input to the synthetic data encoder. The output image is stored and/or displayed 612. In this way a highly realistic output image is created in an efficient manner whilst being able to control individual attributes of the output image. It is possible to animate the object depicted in the real image.

Figure 7:
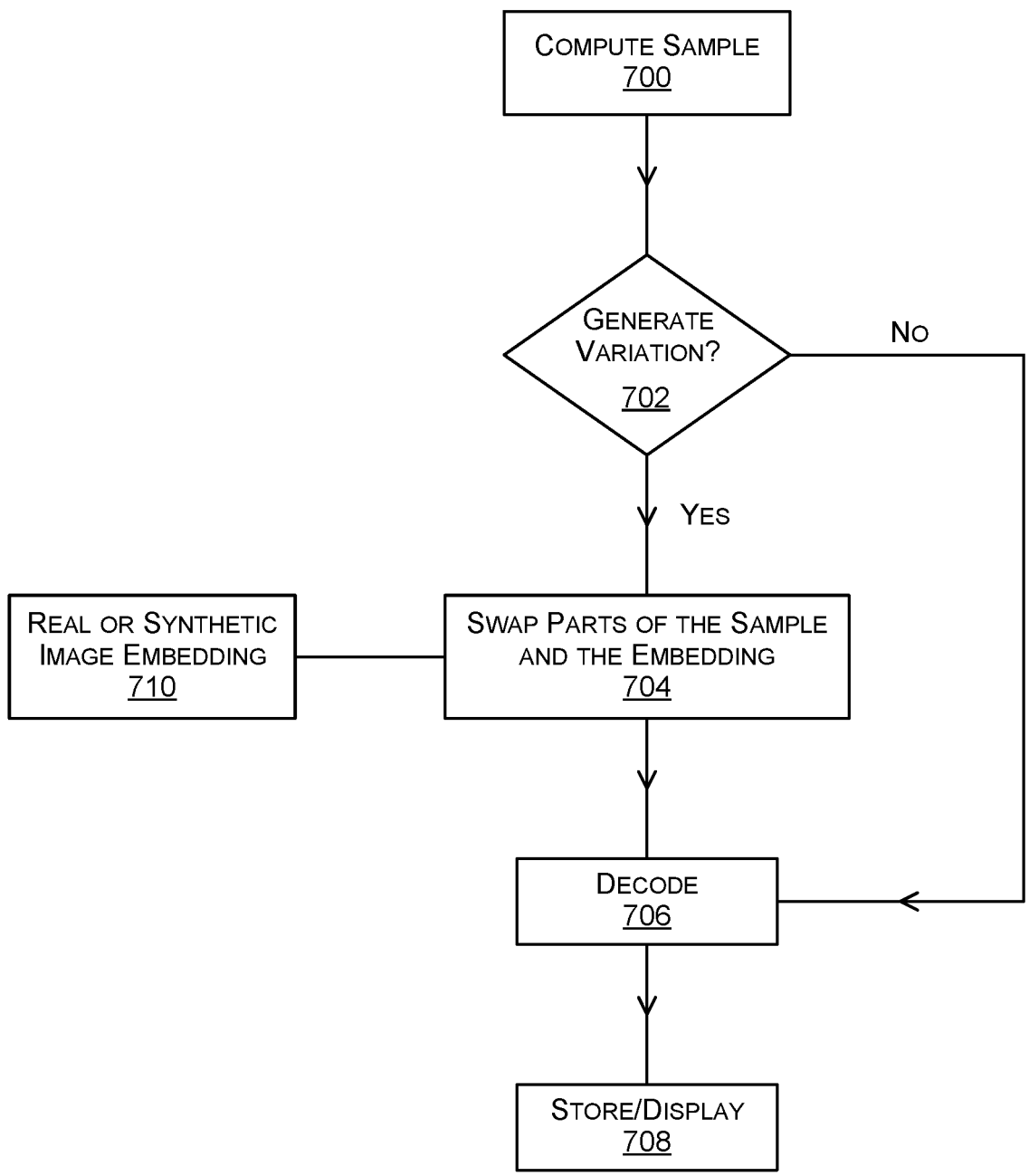
FIG. 7 is a flow diagram of another method of operation at a neural renderer.

FIG. 7 is an example of a method of generating a new image from the neural renderer without the need to input an image as part of the test time operation. FIG. 7 also illustrates a method of generating a new image from an existing real or synthetic image by using a sample generated from the latent space of the neural renderer.

Samples of the latent space are used to generate novel images or to sample individual factor $z_i$. The sampled $z_i$ are used to generate additional variations of an existing image that was embedded in z. A latent generative adversarial network (GAN) is used. The latent GAN is trained to map between its input $\omega \sim N(0,1)$ and the latent space z. This approach allows for sampling the latent space without the constraints on z imposed by variational auto encoders that lead to reduced quality. The latent GAN is trained with the GAN losses described with reference to FIG. 9 below. Both the discriminator and generator $G_{lat}$ are 3-layer multi-layer perceptrons.

The neural renderer computes 700 a sample from the latent space. The sample is an embedding in the multi-dimensional space of the encoders. The neural renderer checks 702 whether it is desired to generate a variation of an existing real or synthetic image. If not, it sends the sample to the decoder and the decoder decodes 706 the sample to generate an output image. The output image depicts an object of the type of objects that the neural renderer has been trained to deal with. The attributes of the object are as specified in the sample; that is, a user or other process has not needed to input values of parameters to specify the attributes.

If it is desired to generate a variation of an existing real of synthetic image then a swap is done at operation 704. One or more parts of the sample are swapped 710 with factors from an embedding of a real or synthetic image. Once the swap has been done the modified sample is input to the decoder. The decoder decodes 706 the modified sample to produce an output image. The output image depicts an object of the type of objects that the neural renderer has been trained to deal with but where one or more attributes of the object are as in the real or synthetic image used to obtain the embedding at operation 710.

The output image is stored and/or displayed 708.

Figure 8:
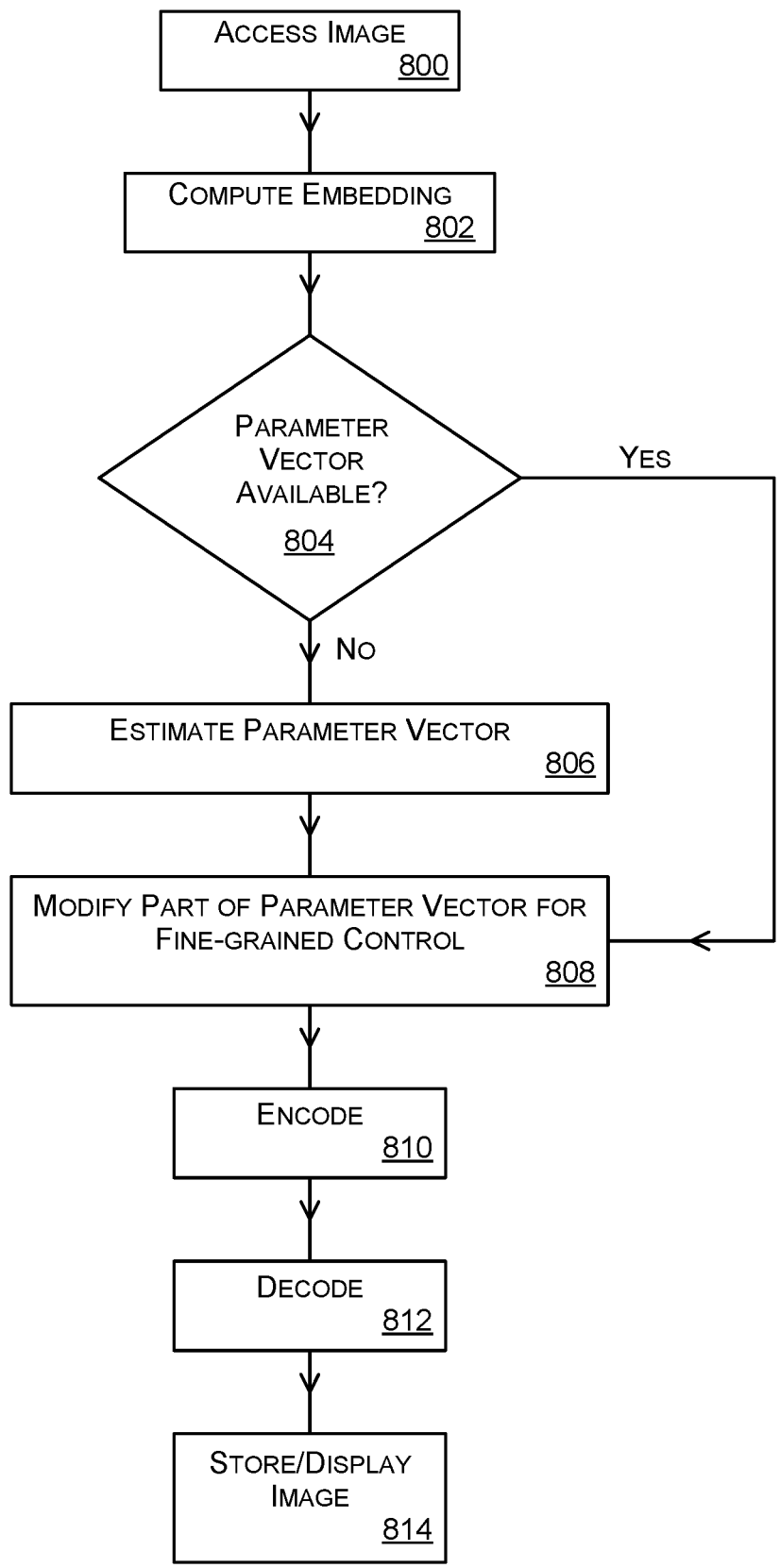
FIG. 8 is a flow diagram of another method of operation at a neural renderer.

FIG. 8 is a flow diagram of a method of operation at a neural renderer to achieve finer grained control of attributes of output images than achieved using the method of FIG. 6 or FIG. 7. If face expression is an attribute then fine grained control means being able to control a single aspect of face expression such as intensity of smile whilst leaving other aspects of face expression such as eyebrow pose invariant. If illumination is an attribute then fine grained control means being able to control a single aspect of illumination such as brightness whilst leaving other aspect such as contrast static. Thus attributes of images have one or more aspects which are individually controllable by using the method of FIG. 8.

The neural renderer accesses 800 an image which is either a real image or a synthetic image. The neural renderer computes 802 a factorized embedding of the image by using one of the encoders. The neural renderer checks 804 whether a parameter vector is available where the parameter vector specifies values of parameters used to generate the image using the synthetic rendering apparatus. If the image accessed at operation 800 is a real image there is no parameter vector available. In this case the parameter vector is estimated 806. To estimate the parameter vector an optimization is computed to find an estimated parameter vector which when given to the synthetic encoder will produce an embedding which is similar to the embedding computed at operation 802.

If the image accessed at operation 800 is a synthetic image there is a parameter vector already available since the values of the parameters used to generate the synthetic image are known.

The neural renderer modifies 808 part of the parameter vector (which is either the estimated parameter vector or the actual parameter vector) for fine grained control. In an example, to control brightness the neural renderer finds the part of the parameter vector which controls brightness and modifies it appropriately. It is known how to modify the parameter vector since the parameter vector is input to the synthetic renderer.

The modified parameter vector is encoded 810 to produce a factorized embedding. The factorized embedding is decoded 812 by the decoder to produce an output image which depicts the object in the image accessed at operation 800 and with fine grained control of the aspect of the attribute. The output image is stored and/or displayed at operation 814.

Given an existing face image embedded into z, it is possible to swap any part, $z_i$, of its embedding with one that is obtained from $E_S$ or $E_R$. However, sometimes a finer level of control is desired such as to only modify a single aspect of $z_i$ while leaving the rest the same. If $z_i$ is a face expression, its single aspect might be the intensity of smile, if $z_i$ is illumination, the brightness might be one aspect. These aspects are controlled by individual elements of the corresponding θi vector. However θi is unknown if the z was generated by $E_R$ or $G_{lat}$.

Compute an approximation $\tilde{\theta}_i$ obtained by solving the minimization problem $\min_{\tilde{\theta}_i} |z_i - E_{s_i}(\theta i)|^2$ with gradient descent, where $E_{s_i}$ is the part of $E_S$ that corresponds to θi. Optionally incorporate constraints on θi into the optimization algorithm. For example, expression parameters lie in the convex set [0,1] and use projected gradient descent to incorporate the constraint into the minimization algorithm. Given $\tilde{\theta}_i$, e.g. a face expression vector, modify the part of the vector responsible for an individual expression and use $E_S$ to obtain a new latent code $z_i$ that generates images where only this individual expression is modified.

Figure 9:
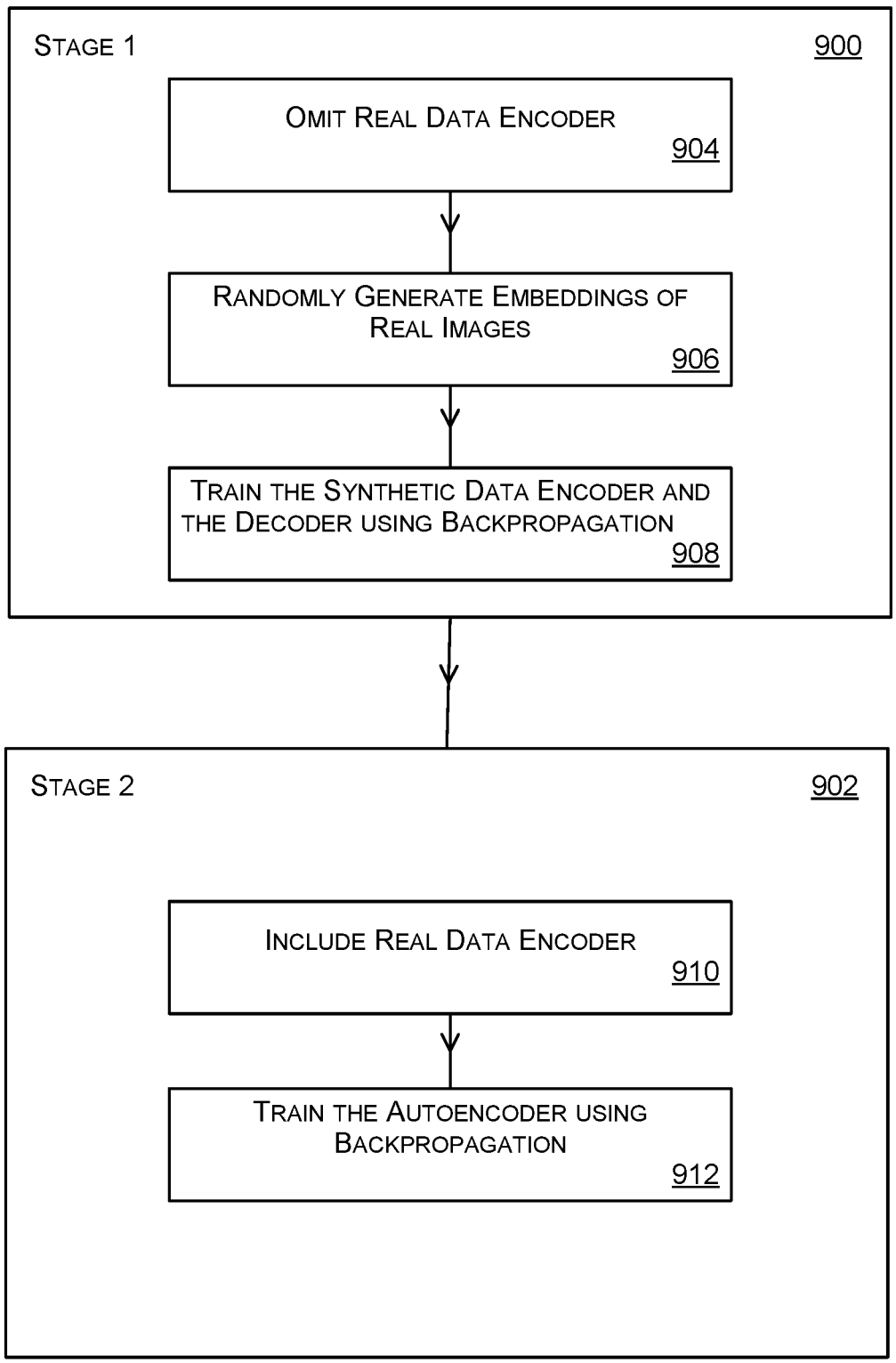
FIG. 9 is a flow diagram of a two stage training process used to train a neural renderer.

FIG. 9 shows a two stage training process which is found to improve controllability and image quality. It is not essential to use the two stage training process.

With reference to FIG. 9 a first stage 900 involves omitting the real data encoder 904 and randomly generating 906 embeddings of real images. During the first stage the synthetic data encoder and the decoder are trained using backpropagation 908 and using synthetic images.

The first stage ends when there is little or no change in the synthetic data encoder and the decoder; or the first stage ends when a specified amount of synthetic training images have been used.

In the second stage 902 the real data encoder is included 910. The autoencoder is trained using backpropagation 912 and using batches of training data comprising both real and synthetic images. The second stage ends when there is little or no change in the encoders and the decoder; or the second stage ends when a specified amount of training images have been used.

In examples where two stage training is not used there is a single training stage which is the same as the second stage 902 of FIG. 9.

In the first stage 900: train all the sub-networks except $E_R$ 300, sampling $z_R \sim N(0,1)$ as there is no encoder for real data at this stage. At this stage $E_S$ and G 306 are trained with the following loss:

$$L_1 = L_{GAN_G}(D_R, Gz_R) L_{GAN_G}(D_{DA}, Z_S) + L_{GAN_G}(D_S)G(Z_S)) \lambda_{eye} L_{eye} + \lambda_{perc} L_{perc}(G(z_S), J_S) \quad \text{(equation 5)}$$

where $z_S = E_S(\theta)$ and λ are the weights assigned to the corresponding losses. The domain discriminator $D_{DA}$ acts on $E_S$ to bring the distribution of its outputs closer to N(0, I) and so $E_S$ effectively maps the distribution of each θi to N(0, I).

In the second stage 902: add the real data encoder $E_R$ so that $z_R = E_R(I_R)$. The loss used for training $E_S$ and G is then:

$$L_2 = L_1 + \lambda_{perc} L_{perc}(G(z_R), I_R) + \log(1 - D_{DA}(Z_R)), \quad \text{(equation 6)}$$

where the goal of $\log - D_{DA}(Z_R)$ is to bring the output distribution of $E_R$ closer to that of $E_S$. In the second stage increase the weight of $\lambda_{perc}$, in the first stage it is set to a lower value as otherwise total loss for synthetic data would overpower that for real data. In the second stage both real and synthetic data use the perceptual loss and increase its weight. Experiments show that this two-stage training improves controllability and image quality.

One-shot learning by fine tuning is used in some examples. It is not essential to use one-shot learning by fine tuning. One-shot learning by fine tuning comprises pre-training the encoder and the decoders (using the first and second stages of FIG. 9 or only the second stage of FIG. 9)

and then training again using real images and with a loss function that encourages the neural renderer to reduce an identity gap between a face depicted in the real image and in the output image. It is unexpectedly found that one-shot learning by fine tuning is effective. One-shot learning modifies the embeddings and the whole decoder and it is surprising that control of the output image is still possible through the factorized embeddings even after one-shot learning by fine tuning has been done.

The neural renderer architecture allows for embedding face images into z using the real data encoder $E_R$, and therefore individual factors zi can be modified to modify the corresponding output image. To reduce any identity gap between the face in $I_R$ and in the generated image it is possible to fine-tune the generator on $I_R$ by minimizing the following loss:

$$L_{ft}=L_{GAN_G}(D_R,I_R,G(\hat{z}_R))+\log(1-D_{DA}(\hat{z}_R))+\lambda_{perc}[L_{perc}(G(\hat{z}_R),I_R)+L_{face}(G(\hat{z}_R),I_R)],$$ (equation 7)

where $L_{face}$ is a perceptual loss with a 16 layer convolutional neural network as the pre-trained network. Optimize over the weights of G as well as $\hat{z}_R$ which is initialized with ($E_R (I_R)$). The addition of a $L_{face}$ improves the perceptual quality of the generated face images.

A detailed example is now given for the case where the images depict faces. This example also works for the case where the images depict another type of object, such as automobiles, human body, laptop computer, cat, dog, or other type of object.

In this example, the architecture of the decoder G 306 is configured to decouple object rotation from the latent space and allow for specifying object rotation with any parametrization (Euler angles or quaternions). Object pose such as head pose is thus obtained in a parameterization which is suitable for input to the decoder without requiring an encoder.

The remaining k−1 parts of θ are encoded with separate multi-layer perceptrons (MLPs 404) $E_{s_i}$, each of which consists of 2 layers with a number of hidden units equal to the dimensionality of the corresponding θi. The real image encoder $E_R$ is a ResNet-50 pre-trained on ImageNet. The domain discriminator $D_{DA}$ is a 4-layer MLP. The two image discriminators $D_R$ and $D_S$ share the same basic convolutional architecture.

For the perceptual loss use layers conv_1_2, conv_2_2, conv_3_4, conv_4_4 of the 19 layer convolutional neural network. Regularize the discriminators with an $R_1$ gradient penalty. In the image discriminators, use a style discriminator loss $L_{style}$, while in the generator add an identity loss $L_{identity}$. Use a separate network that has the same architecture as the image discriminators because neither of the discriminators is trained to work with both real and synthetic data. Set the loss weights as follows: eye loss weight $\lambda_{eye}=5$, domain adversarial loss weight $\lambda_{DA}=5$, identity loss weight $\lambda_{identity}=10$, gradient penalty loss weight $\lambda_{R1}=10$, perceptual loss weight in 1st stage $\lambda_{perc}=0.0001$, perceptual loss weight in 2nd stage $\lambda_{perc}=0.0005$. The adversarial losses on the images and style discriminator losses have weight 1.

In the first training stage sample $z\sim N(0, I)$ and $r_R\sim U(-r_{lim}, r_{lim})$, where $r_R$ is the rotation sample for real data and $r_{lim}$ is a pre-determined, per axis rotation limit. In the experiments set $r_{lim}$ to be identical to the rotation limits used in synthetic data generation as described in the dataset section. In the second stage the $E_R$ output corresponding to $r_R$ is constrained to the range specified in $r_{lim}$ by using a tanh activation and multiplying the output by rum.

The architecture of the generator network G (also referred to as the decoder 306) is given in the table below.

| Layer name | Kernel shape | Activation | Output shape | Normalisation |
|---|---|---|---|---|
| learned const input | — | — | 4 × 4 × 4 × 512 | — |
| upsampling | — | — | 8 × 8 × 8 × 512 | — |
| conv3d 1 | 3 × 3 × 3 | LReLU | 8 × 8 × 8 × 256 | AdaIN |
| upsampling | — | — | 16 × 16 × 16 × 256 | — |
| conv3d 2 | 3 × 3 × 3 | LReLU | 16 × 16 × 16 × 128 | AdaIN |
| volume rotation | — | — | 16 × 16 × 16 × 128 | — |
| conv3d 3 | 3 × 3 × 3 | LReLU | 16 × 16 × 16 × 64 | — |
| conv3d 4 | 3 × 3 × 3 | LReLU | 16 × 16 × 16 × 64 | — |
| reshape | — | — | 16 × 16 × (16 · 64) | — |
| conv2d 1 | 1 × 1 | LReLU | 16 × 16 × 512 | — |
| conv2d 2 | 4 × 4 | LReLU | 16 × 16 × 256 | AdaIN |
| upsampling | — | — | 32 × 32 × 256 | — |
| Conv2d 3 | 4 × 4 | LReLU | 32 × 32 × 64 | AdaIN |
| upsampling | — | — | 64 × 64 × 64 | — |
| Conv2d 4 | 4 × 4 | LReLU | 64 × 64 × 32 | AdaIN |
| upsampling | — | — | 128 × 128 × 32 | — |
| Conv2d 5 | 4 × 4 | LReLU | 128 × 128 × 32 | AdaIN |
| upsampling | — | — | 256 × 256 × 32 | — |
| Conv2d 6 | 4 × 4 | tanh | 256 × 256 × 3 | — |

The table below shows the architecture of the image discriminators $D_R$, $D_S$. Most of the convolutional layers of the discriminator use instance normalization. The latent GAN generator $G_{lat}$ and discriminator share the same 3-layer MLP architecture.

| Layer name | Kernel shape, stride | Normalisation | Activation | Output shape |
|---|---|---|---|---|
| conv2d 1 | 1 × 1, 1 | — | | 256 × 256 × 3 |
| conv2d 2 | 3 × 3, 2 | LReLU | | 128 × 128 × 48 Instance Norm |
| conv2d 3 | 3 × 3, 2 | LReLU | | 64 × 64 × 96 Instance Norm |
| conv2d 4 | 3 × 3, 2 | LReLU | | 32 × 32 × 192 Instance Norm |
| conv2d 5 | 3 × 3, 2 | LReLU | | 16 × 16 × 384 Instance Norm |
| conv2d 6 | 3 × 3, 2 | LReLU | | 8 × 8 × 768 Instance Norm |
| fully connected | 49152 | — | 1 | — |

The networks are optimized using the Adam algorithm with a learning rate of 4e-4. Perform the first stage of training for 50 k iterations and then the second stage for 100 k iterations. The latent GAN is also trained for 100 k iterations. In both the latent GAN and decoder G, keep an exponential running mean of the weights during training and use those smoothed weights to generate results.

In the present example the training data included 60,000 real images each of size 1 Mpix and 30,000 synthetic images each of size 1 Mpix. The real and synthetic images are of faces and where aligned to a standard reference frame using landmarks and were reduced in resolution to 256×256 pixels.

The validation data included 10,000 real images.

The synthetic images were generated using a synthetic image renderer and setting rotation limits for yaw and pitch to ±30° and ±10° to cover a typical range of poses in face images. For the synthetic images generated, θ has m=304 dimensions, while z has n=145 dimensions, and is divided into k=12 factors.

The following table shows the dimensionalities of latent space factors zi and corresponding synthetic data parameters θi. The dimensionalities of each zi were chosen based on perceived complexity of the feature, for example allocate more dimensions to expression than to hair colour. The expression parameters consist of 51 expression blendshapes and one additional dimension for the rotation of the jaw bone that leads to mouth opening.

| Factor name | dim θi | dim $z_i$ | Description of θi |
|---|---|---|---|
| beard style | 9 | 7 | Principal component analysis coefficients |
| eyebrow style | 44 | 7 | Principal component analysis coefficients |
| expression | 52 | 30 | 3D head model parameters ∈ [o, 1] |
| eye colour | 6 | 3 | one-hot encoding |
| eye rotation | 3 | 2 | rotation angles |
| hair colour | 3 | 3 | melanin, grayness, redness |
| hair style | 18 | 8 | Principal component analysis coefficients |
| head shape | 53 | 30 | 3D head model parameters |
| illumination | 50 | 20 | Principal component analysis coefficients |
| lower eyelash style | 3 | 2 | one-hot encoding |
| texture | 50 | 30 | Variational autoencoder latent space vector |
| upper eyelash style | 3 | 2 | one-hot encoding |

A user study was carried out with 59 users. The users evaluated the presence of an attribute in a total of 1771 image pairs. Each image pair was made up of an image of a face with the attribute and an image of the same face with the opposite attribute. An example of an image pair is an image of a person with blond hair and an image of the same person with black hair. Another example of an image pair is an image of a person with eyes shut and an image of the same person with eyes open. The images in the image pairs were generated using the neural renderer of the detailed example and by controlling individual attributes as described herein. The users also had to indicate whether the images in a pair depicted the same person or not. The results of the user study found that the neural renderer was able to generate images which were perceived by the human subjects to have attributes controlled as expected. The results of the user study found that the neural renderer was able to control the images without influencing whether the face in the images of a pair were perceived by the human subjects as depicting the same person or not.

Figure 10:
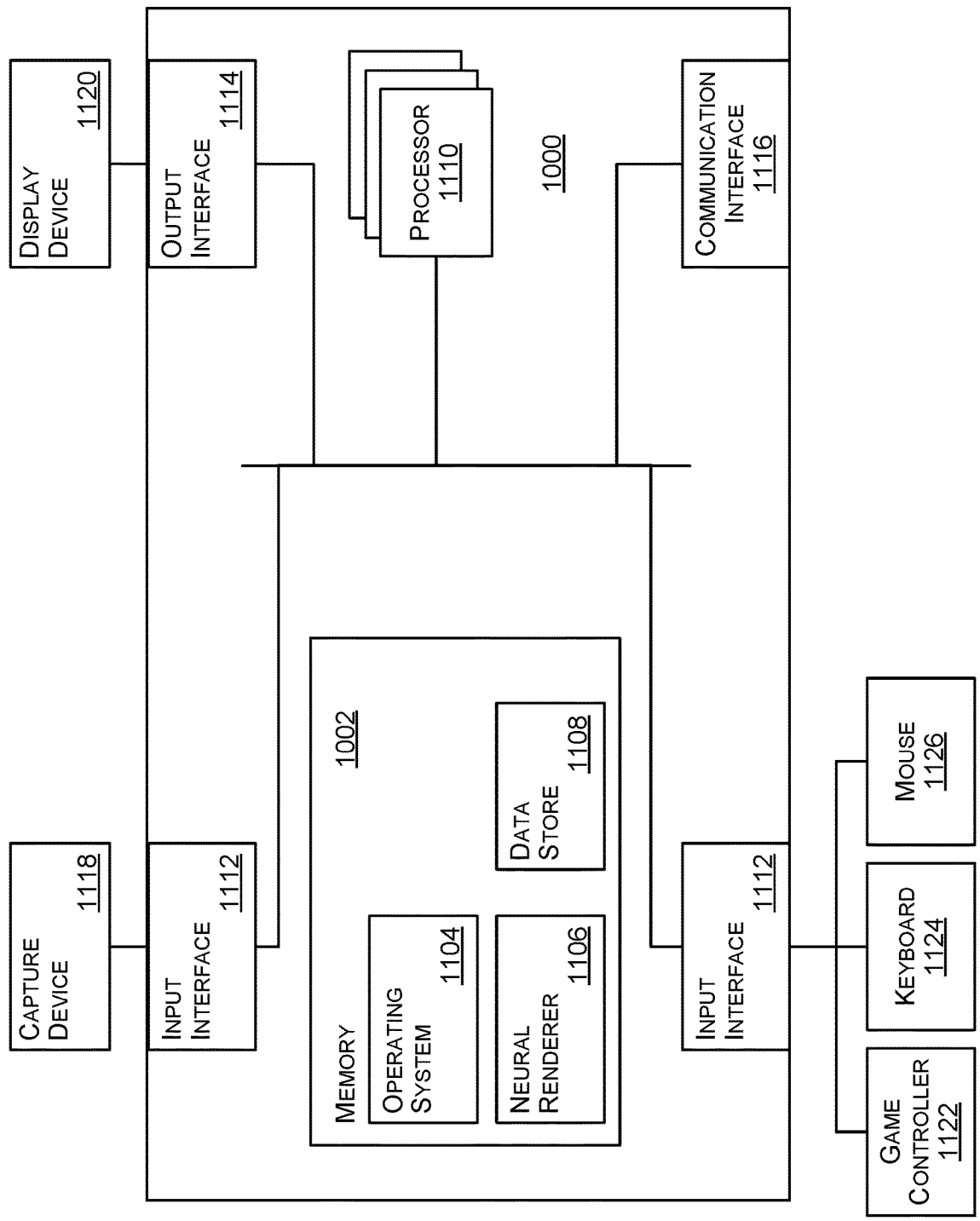
FIG. 10 illustrates an exemplary computing-based device in which embodiments of a neural renderer are implemented. Like reference numerals are used to designate like parts in the accompanying drawings.

FIG. 10 illustrates various components of an exemplary computing-based device 1000 which are implemented as any form of a computing and/or electronic device, and in which embodiments of a neural renderer are implemented in some examples.

Computing-based device 1000 comprises one or more processors 1110 which are microprocessors, controllers or any other suitable type of processors for processing computer executable instructions to control the operation of the device in order to generate images, edit existing images and optionally train a neural renderer. In some examples, for example where a system on a chip architecture is used, the processors 1110 include one or more fixed function blocks (also referred to as accelerators) which implement a part of the method of operating or training a neural renderer in hardware (rather than software or firmware). Platform software comprising an operating system 1104 or any other suitable platform software is provided at the computing-based device to enable application software to be executed on the device. A neural renderer 1106 is at the computing-based device as well as data store 1108. Data store 1108 stores parameter values, images and other data.

The computer executable instructions are provided using any computer-readable media that is accessible by computing based device 1000. Computer-readable media includes, for example, computer storage media such as memory 1002 and communications media. Computer storage media, such as memory 1002, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1002) is shown within the computing-based device 1000 it will be appreciated that the storage is, in some examples, distributed or located remotely and accessed via a network or other communication link (e.g. using communication interface 1116).

The computing-based device 1000 also comprises an output interface 1114 arranged to output display information, such as output images and a graphical user interface to enable a user to enter parameter values, to a display device 1120 which is separate from or integral to the computing-based device 1000. An input interface 1112 is arranged to receive and process input from a capture device 1118 such as a camera. The input interface 1112 receives and processes input from one or more user input devices such as game controller 1122, keyboard 1124, mouse 1126 or other user input device. In some examples one or more of the user input devices detects voice input, user gestures or other user actions and provides a natural user interface (NUI). This user input may be used to view output images, specify input images and specify parameter values for input to the neural renderer. In an embodiment the display device 1120 also acts as a user input device if it is a touch sensitive display device.

A method of image processing comprising:

sampling an embedding from a latent space learnt by an autoencoder;

generating an image from the embedding using a decoder of the autoencoder;

where the autoencoder comprises two encoders, one configured to map real images to embeddings in the latent space and another configured to map parameter values of a synthetic image rendering apparatus to embeddings in the latent space; and where the two encoders have been trained using adversarial training such that a distribution of embeddings computed by the first encoder is substantially the same as a distribution of embeddings computed by the second encoder.

A method as described in the immediately preceding paragraph comprising modifying the sampled embedding using an embedding computed from another image before generating the image using the decoder.

Alternatively or in addition to the other examples described herein, examples include any combination of the following clauses:

Clause A. A method of image processing comprising: storing a real image of an object in memory, the object being a specified type of object; computing, using a first encoder, a factorized embedding of the real image; receiving a value of at least one parameter of a synthetic image rendering apparatus for rendering synthetic images of objects of the specified type, the parameter controlling an attribute of synthetic images of objects rendered by the rendering apparatus; computing an embedding factor of the received value using a second encoder; modifying the factorized embedding with the computed embedding factor; and computing, using a decoder with the modified embedding as input, an output image of an object which is substantially the same as the real image except for the attribute controlled by the parameter. The real images, which are input to the image processing apparatus without labels, extend the variety of the generated output images and encourage realism. The factorization of the embedding into factors that correspond to the inputs of a traditional synthetic image rendering apparatus such as head pose, facial expression, hair style, illumination and many others is achieved without the need to annotate real data. It is very hard to annotate in real data in such a way. The image processing method enables control of individual aspects of output images in semantically meaningful ways. The computing operation which uses the decoder involves transforming data since the decoder transforms the modified embedding into the output image.

Clause B. The method of clause A wherein modifying the factorized embedding comprises swapping at least one part of the factorized embedding with the computed embedding factor. Swapping is efficient to execute and gives good performance.

Clause C The method of clause A or clause B wherein the object is a face and the attributes are selected from one or more of: beard style, eyebrow style, expression, eye colour, eye rotation, hair colour, hair style, head shape, illumination, lower eyelash style, texture, upper eyelash style. The method is particularly useful in the case of face images for controlling attributes such as those listed here. But it is also useful and extremely effective for images of other types of objects such as vehicles where the attributes include: pose, illumination, configuration (whether doors open, windows open etc).

Clause D The method of any preceding clause wherein the first and second encoders have been trained using adversarial training such that a distribution of embeddings computed by the first encoder is substantially the same as a distribution of embeddings computed by the second encoder. In this way the factorization achieved through the synthetic data encoder is transferred to the output of the real data encoder. The factorization is useful because it enables semantically meaningful control of the output image attributes.

Clause E The method of any preceding clause wherein the first encoder has been trained to map real images to an embedding and the second encoder has been trained to map the parameters of a synthetic image rendering apparatus to an embedding. In this way an autoencoder is formed which is able to use both real and synthetic data but without having to take synthetic images as input. Inputs to the second encoder are parameters which are familiar to a user of a traditional synthetic image rendering apparatus.

Clause F The method of any preceding clause comprising controlling attributes of the output image by receiving values of parameters of the synthetic image rendering apparatus. Independent control is a significant benefit because it enables the output image to be controlled in an expected manner without having unintended effects.

Clause G The method of any preceding clause wherein the output image is computed without using a 3D model of the object depicted in the real image. A 3D model of the object depicted in the real image is expensive and time consuming to obtain. It is also complex to process and uses storage capacity.

Clause H The method of any preceding clause wherein the factorized embedding comprises an embedding having a plurality of factors, individual ones of the factors corresponding to separate parameters of the synthetic image rendering apparatus. Having factors corresponding to separate parameters enables controllability.

Clause I The method of any preceding clause wherein the encoders and the decoder together form an autoencoder and wherein the autoencoder has been trained on both real images and synthetic images using a two stage training procedure, wherein during the first stage the first encoder is omitted and the embedding of the real image is randomly generated, and during the second stage the first encoder is present. Two-stage training of the neural renderer is found to improve controllability and image quality.

Clause J The method of any preceding clause wherein the encoders and the decoder are pre-trained and then trained using one-shot learning. In this way objects depicted in images generated by the autoencoder are closer in identity to the corresponding object depicted I the real image. The one-shot learning is found to give good results despite the fact that it changes the latent space and the decoder.

Clause K The method of any preceding clause comprising generating a novel image by computing a sample from a latent space of the first and second encoders and decoding the sample using the decoder, wherein the samples are computed using a generative adversarial network from a set of random numbers. This provides a way to generate novel images without having to input an image to the encoder.

Clause L The method of any preceding clause comprising computing a sample from a latent space of the first and second encoders and using the sample to generate a variation of an image embedded in the latent space. This provides a way to generate novel variations of images.

Clause M The method of any preceding clause comprising computing an estimate of a parameterization vector of the synthetic image rendering apparatus that corresponds to a part of the factorized latent space. By estimating the parameterization vector it is possible to obtain a parameterization vector even for real images and other images which do not otherwise have a parameterization vector.

Clause N The method of clause M comprising modifying part of the estimated parameterization vector corresponding to an individual object attribute and using the modified estimated parameterization vector to generate an output image where only the individual object attribute is modified. In this way fine grained control is achieved whereby individual aspects of an individual attribute are controllable.

Clause O The method of clause M or clause N comprising computing the estimate by computing an optimization using constraints including that the parameters are within a specified range. Using constraints facilitates efficiency of finding solutions to the optimization.

Clause P The method of any preceding clause comprising using a plurality of parameterized functions as part of the second encoder, individual ones of the parameterized functions corresponding to individual parts of a vector of parameters of the synthetic image rendering apparatus. Using a plurality of parameterized functions in the second encoder facilitates factorization of the embedding.

Clause Q The method of any preceding clause comprising using a decoder which decouples object rotation from a latent space of the encoders. Such a type of decoder is useful because it makes it easier for an end user or other process to select parameter values for input to the synthetic data encoder.

Clause R The method of any preceding clause comprising inputting head pose directly without requiring an encoder. This gives efficiency and saves computing resources.

Clause S An image processing apparatus comprising: a memory storing a real image of an object, the object being a specified type of object; a first encoder arranged to compute a factorized embedding of the real image; the memory storing at least one value of a parameter of a synthetic image rendering apparatus for rendering synthetic images of objects of the specified type, the parameter controlling an attribute of synthetic object images rendered by the rendering apparatus; a second encoder arranged to compute an embedding factor of the at least one value; a processor arranged to modify the factorized embedding with the computed embedding factor; and
a decoder arranged to compute an output image of an object which is substantially the same as the real image except for the attribute controlled by the parameter.

Clause T One or more device-readable media with device-executable instructions that, when executed by a computing system, direct the computing system to perform operations comprising:
training a first encoder to map real object images to an embedding; and
training a second encoder to map the parameters of a synthetic image rendering apparatus to a factorized embedding,
where the training is adversarial training such that a distribution of embeddings computed by the first encoder is substantially the same as a distribution of embeddings computed by the second encoder.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method comprising:
    storing a real image of an object in memory, the object being a type of object;
    computing, using a first encoder, a factorized embedding of the real image;
    receiving a value of a parameter of a synthetic image rendering apparatus, the parameter controlling an attribute of a synthetic image of an object of the type rendered by the rendering apparatus;
    computing a predicted embedding factor for the received value using a second encoder;
    modifying the factorized embedding including swapping at least part of the factorized embedding with the computed embedding factor; and
    computing, using a decoder with the modified embedding as input, an output image of the object which is substantially the same as the real image except for the attribute controlled by the parameter.

2. The method of claim 1 wherein the object is a face and the attribute is selected from one or more of: beard style, eyebrow style, expression, eye colour, eye rotation, hair colour, hair style, head shape, illumination, lower eyelash style, texture, upper eyelash style.

3. The method of claim 1 wherein the first and second encoders have been trained using adversarial training such that a distribution of embeddings computed by the first encoder is substantially the same as a distribution of embeddings computed by the second encoder.

4. The method of claim 1 wherein the first encoder has been trained to map real images to an embedding and the second encoder has been trained to map the parameter of the synthetic image rendering apparatus to an embedding.

5. The method of claim 1 comprising independently controlling attributes of the output image by receiving values of parameters of the synthetic image rendering apparatus.

6. The method of claim 1 wherein the output image is computed without using a 3D model of the object depicted in the real image.

7. The method of claim 1 wherein the factorized embedding comprises an embedding having a plurality of factors, individual ones of the factors corresponding to separate parameters of the synthetic image rendering apparatus.

8. The method of claim 1 wherein the encoders and the decoder together form an autoencoder and wherein the autoencoder has been trained on both real images and synthetic images using a two stage training procedure, wherein during a first stage the first encoder is omitted and the embedding of the real image is randomly generated, and during a second stage the first encoder is present.

9. The method of claim 1 comprising generating a novel image by computing a sample from a latent space of the first and second encoders and decoding the sample using the decoder, wherein the sample is computed using a generative adversarial network from a set of random numbers.

10. The method of claim 1 comprising computing a sample from a latent space of the first and second encoders and using the sample to generate a variation of an image embedded in the latent space.

11. The method of claim 1 comprising computing an estimate of a parameterization vector of the synthetic image rendering apparatus that corresponds to a part of a factorized latent space.

12. The method of claim 11 comprising modifying part of the estimated parameterization vector corresponding to an individual object attribute and using the modified estimated parameterization vector to generate an output image where only the individual object attribute is modified.

13. The method of claim 11 comprising computing the estimate by computing an optimization using constraints including that parameters are within a specified range.

14. The method of claim 1 comprising using a plurality of parameterized functions as part of the second encoder, individual ones of the parameterized functions corresponding to individual parts of a vector of parameters of the synthetic image rendering apparatus.

15. The method of claim 1 comprising using a decoder which decouples object rotation from a latent space of the encoders.

16. The method of claim 1, wherein the received value is a user input, and wherein computing the predicted embedding factor for the received value using the second encoder comprises using the received value to compute the predicted embedding factor.

17. An image processing apparatus comprising:
    a memory storing a real image of an object, the object being a type of object;
    a first encoder arranged to compute a factorized embedding of the real image;
    the memory storing a value of a parameter of a synthetic image rendering apparatus, the parameter controlling an attribute of a synthetic image of an object of the type as rendered by the rendering apparatus;
    a second encoder arranged to compute a predicted embedding factor for the value;
    a processor arranged to modify the factorized embedding with the computed embedding factor, wherein modifying the factorized embedding comprises swapping at least part of the factorized embedding with the computed embedding factor; and
    a decoder arranged to compute an output image of the object which is substantially the same as the real image except for the attribute controlled by the parameter.

18. The image processing apparatus of claim 17, wherein the first encoder has been trained to map real images to an embedding and the second encoder has been trained to map parameters of the synthetic image rendering apparatus to an embedding.

19. The image processing apparatus of claim 17, wherein the value of the parameter is a user input, and wherein computing the predicted embedding factor for the value using the second encoder comprises using the value to compute the predicted embedding factor.

20. A computer storage medium with computer executable instructions that, when executed by a computing system, direct the computing system to perform operations comprising:
    training a first encoder to compute a factorized embedding of a real image of an object;
    training a second encoder to map a parameter of a synthetic image rendering apparatus to the factorized embedding including:
        computing a predicted embedding factor for a value of the parameter, and
        swapping at least part of the factorized embedding with the computed embedding factor; and
    wherein the training is adversarial training such that a distribution of embeddings computed by the first encoder is substantially the same as a distribution of embeddings computed by the second encoder.

* * * * *